United States Patent
Rupp et al.

(10) Patent No.: US 12,460,712 B2
(45) Date of Patent: Nov. 4, 2025

(54) GEARING UNIT FOR A DRIVE ASSEMBLY AND METHOD FOR MOUNTING THE GEARING UNIT

(71) Applicant: Schaeffler Technologies AG & Co. KG, Herzogenaurach (DE)

(72) Inventors: Bastian Rupp, Fürth (DE); Jochen Loeffelmann, Eggolsheim (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/593,111

(22) Filed: Mar. 1, 2024

(65) Prior Publication Data

US 2024/0200645 A1   Jun. 20, 2024

Related U.S. Application Data

(63) Continuation of application No. 17/774,490, filed as application No. PCT/DE2020/100963 on Nov. 12, 2020, now Pat. No. 11,994,202.

(30) Foreign Application Priority Data

Dec. 11, 2019  (DE) .................... 10 2019 133 866.2

(51) Int. Cl.
| | |
|---|---|
| *F16H 57/027* | (2012.01) |
| *F16H 1/20* | (2006.01) |
| *F16H 57/023* | (2012.01) |
| *F16H 57/031* | (2012.01) |
| *F16H 57/02* | (2012.01) |

(52) U.S. Cl.
CPC ............. *F16H 57/027* (2013.01); *F16H 1/20* (2013.01); *F16H 57/023* (2013.01); *F16H 57/031* (2013.01); *F16H 2057/02043* (2013.01)

(58) Field of Classification Search
CPC ........ F16H 57/027; F16H 57/023; F16H 1/20; F16H 57/031; F16H 2057/02043; F01M 2013/0422; F01M 2013/0427
See application file for complete search history.

(56) References Cited

U.S. PATENT DOCUMENTS

| | | | | |
|---|---|---|---|---|
| 1,979,025 | A * | 10/1934 | Carvelli | F01M 1/06 |
| | | | | 464/7 |
| 2,818,047 | A * | 12/1957 | Powell | F01M 13/04 |
| | | | | 74/606 R |
| 8,821,332 | B2 * | 9/2014 | Kawamura | F16H 57/027 |
| | | | | 464/17 |

(Continued)

FOREIGN PATENT DOCUMENTS

| | | |
|---|---|---|
| CN | 201627905 U | 11/2010 |
| CN | 103635713 A | 3/2014 |

(Continued)

*Primary Examiner* — Thomas C Diaz (57) ABSTRACT

A gearing unit for a drive assembly includes a gearing device for converting a drive torque of the drive assembly. The gearing device includes an input shaft, and the input shaft defines a main axis. A gearing housing defines an accommodation space and houses the gearing device in the accommodation space. A venting device is mounted on the gearing housing and extends through the gearing housing to the accommodation space. The venting device is arranged coaxially with the main axis and on an axial end face of the input shaft.

9 Claims, 4 Drawing Sheets

(56) References Cited

U.S. PATENT DOCUMENTS

| | | | |
|---|---|---|---|
| 9,309,959 B2 * | 4/2016 | Ishikawa | F16H 57/027 |
| 9,347,545 B2 | 5/2016 | Hensel | |
| 2014/0014662 A1 * | 1/2014 | Hensel | F16L 27/08 |
| | | | 220/367.1 |

FOREIGN PATENT DOCUMENTS

| | | | |
|---|---|---|---|
| CN | 103842200 A | 6/2014 | |
| DE | 423791 C * | 1/1926 | F01M 13/00 |
| DE | 102009005347 A1 | 7/2010 | |
| DE | 112012000684 T5 | 11/2013 | |
| DE | 102015105243 A1 | 10/2015 | |
| FR | 3011900 A3 | 4/2015 | |
| SU | 945538 A1 * | 7/1982 | F16H 57/04 |

\* cited by examiner

GEARING UNIT FOR A DRIVE ASSEMBLY AND METHOD FOR MOUNTING THE GEARING UNIT

CROSS-REFERENCE TO RELATED APPLICATIONS

This application is a continuation of U.S. patent application Ser. No. 17/774,490 filed May 5, 2022, which is the U.S. National Phase of PCT Appln. No. PCT/DE2020/100963 filed Nov. 12, 2020, which claims priority to DE 102019133866.2 filed Dec. 11, 2019, the entire disclosures of which are incorporated by reference herein.

TECHNICAL FIELD

The disclosure relates to a gearing unit for a drive assembly. The disclosure further relates to a method for mounting the gearing unit.

BACKGROUND

During operation of a wet-running gearbox, vapors and/or air can arise in a housing of the gearbox, which can increase an internal pressure in the housing and thus can influence the operating safety of the gearbox. For this purpose, vents, such as membranes or slotted rubber caps, are screwed into the housing of the gearbox in order to discharge air/vapors located in the housing. In this case, geometries and components can be provided in the housing which protect the vent from splashing and foaming oil and are thus intended to prevent oil from clogging or escaping.

The patent application DE 102009005347 A1 discloses a spur gear which comprises a housing formed by a housing wall and a shaft. The housing comprises a screw plug and a venting valve, which are screwed into through-holes with internal threads in the housing wall, wherein the through-holes with internal threads and the screw plug and the venting valve are designed in such a way that the venting valve and the screw plug can be screwed into the other respective through-hole.

SUMMARY

The disclosure provides a gearing unit, which is designed and/or suitable for a drive assembly, having an advantageous arrangement of a venting device.

The gearing unit serves in particular to transmit and/or distribute a drive torque in the drive assembly. The gearing unit may be connected to a drive unit in a driving manner, wherein the drive unit generates and/or provides the drive torque. In particular, the gearing unit is designed and/or suitable for a vehicle, wherein the drive unit generates and/or provides a traction torque, in particular a main traction torque, for the vehicle. The drive unit may be designed as an electric drive unit, in particular as an electric motor.

The gearing unit has a gearing device, which is designed and/or suitable for transmitting the drive torque. In particular, the gearing device is used for stepping down, also known as "reduction". The gearing device may have a transmission ratio of I>1. The gearing device may be designed as a single-stage or multi-stage, e.g., two-stage, gear train.

The gearing device has an input shaft. In particular, to form a gear stage, the input shaft is in engagement with a gear wheel of the gearing device designed as a gear train. The gear wheel can be designed as an output wheel or an intermediate wheel. The input shaft may be connected to the drive unit in a driving manner and thus form a drive shaft. The input shaft defines a main axis in particular with its axis of rotation or longitudinal axis.

The gearing unit has a gear housing which is designed and/or suitable for accommodating the gearing device. The gearing housing is in particular made up of multiple parts, e.g., two parts. For this purpose, the gearing housing has at least two housing components which are connected to one another in the axial and/or radial direction in relation to the main axis. The gearing housing defines an accommodation space for the gearing device. In particular, the accommodation space is and/or can be filled with an oil. The gearing housing may form an integral part of the drive unit, in particular of the electric motor, wherein the gearing housing, in particular one of the two housing components, also forms a housing section of the drive unit for this purpose.

Furthermore, the gearing unit has a venting device which is designed and/or suitable for venting the accommodation space. In particular, the venting device discharges gases, in particular air and/or vapors, from the accommodation space. The venting device is preferably designed and/or suitable for implementing automatic and/or permanent venting of the accommodation space. The venting device is mounted on the gearing housing, for example in a detachable manner. The venting device may establish a fluidic connection between the accommodation space and an environment or a venting system. The venting system can be used, for example, for the controlled removal of air and/or for the filtration of liquid components, such as oil or water particles, from the vapor or the air.

In the context of the disclosure, it is proposed that the venting device is arranged coaxially to the main axis and on an axial end side of the input shaft. In particular, the axial end face is defined by an axial end face of the shaft. The venting device may be arranged immediately adjacent to the input shaft, in particular to the end side. "Immediately adjacent" is to be understood to mean that the venting device is arranged in the axial and/or radial direction at the smallest possible distance from the input shaft. For example, the distance can be less than 20 mm, preferably less than 10 mm, in particular less than 5 mm. The venting device may be arranged so close to the input shaft that the oil located in the accommodation space is conveyed away from the venting device due to centrifugal forces when the input shaft rotates. The highest speed in the gearing device may occur on the input shaft, wherein the oil is conveyed radially outwards and thus away from the venting device due to the high speed due to the centrifugal force.

One advantage according to one example embodiment of the disclosure is that the arrangement of the venting device centrally to the input shaft prevents the oil, oil mist, or oil foam from escaping from the accommodation space via the venting device, thereby preventing, or at least significantly reducing, clogging of the venting device with oil. In addition, the venting device or the venting system can be designed in a significantly simpler and thus more cost-effective manner, wherein the maintenance effort is reduced at the same time. A further advantage is that the arrangement of the venting device according to the disclosure proposes a space-optimized venting.

In one embodiment, it is provided that the venting device has a venting channel. In particular, the venting channel defines an airflow path from the accommodation space out of the gearing housing. The venting channel has an axial channel section which extends coaxially to the main axis in the accommodation space in order to bridge an axial distance between the input shaft and the gearing housing. In particular, the axial channel section extends outwards in the axial direction with respect to the main axis from the end side of the gearbox input shaft through the accommodation space and the gearing housing. In its simplest configuration, the venting channel is thus designed as a straight piece of pipe which runs from the accommodation space to an outside of the gearing housing and defines the axial channel section.

A particularly simple and cost-effective design of the venting device is thus proposed, which can be easily integrated into the gearing housing.

In a further embodiment, it is provided that the venting channel has an inlet opening and an outlet opening. In particular, the inlet opening is arranged inside the accommodation space and the outlet opening is arranged outside the accommodation space, e.g., outside the gearing housing. The air flow path thus runs from the accommodation space via the inlet opening and at least the axial channel section to the outlet opening. In this case, the venting channel has an ascending portion between the inlet opening and the outlet opening. In particular, the ascending portion ensures that oil that has gotten into the venting channel can flow out again in the direction of the inlet opening and is prevented from escaping at the outlet opening. The venting channel may be diverted at least once, in particular in the radial direction. For this purpose, the venting channel has a radial channel section which adjoins the axial channel section at an angle, for example at right angles, outside the gearing housing. In an installation situation, the radial channel section, in particular with the outlet opening, is directed upwards, so that oil located in the axial channel section is prevented from escaping. An "upward" orientation is to be understood as meaning that the radial channel section is oriented at least approximately in a 12 o'clock position in relation to an imaginary clock face. However, it is also conceivable that the radial channel section can deviate to a certain extent from this position, for example to an 11 o'clock or 1 o'clock position.

Due to the ascending, in particular angled, channel routing, oil, which has gotten into the venting channel, is prevented from reaching the outlet opening directly.

In a further embodiment, it is provided that the input shaft has a recess on the axial end side, which extends coaxially to the main axis. In particular, when the input shaft rotates, the oil is guided away from the venting channel on an inner circumference of the recess. In particular, the recess is designed as a bore made in the axial direction. The axial channel section is arranged with an axial end, in particular at least with its input opening, within the recess at a distance from the input shaft. In particular, the axial channel section is arranged at a distance from the input shaft both in the axial and in the radial direction, with the air flow path running from the accommodation space via the recess to the input opening. The axial channel section can, for example, be accommodated within the recess with an axial length of more than 10 mm, preferably more than 25 mm, in particular more than 50 mm.

Due to the arrangement of the inlet opening within the recess, the air flow path is additionally diverted, so that oil in the accommodation space does not reach the inlet opening directly. In addition, when the input shaft rotates, the oil can be guided away from the input opening in a particularly reliable manner.

In a further embodiment, the recess is designed as a conical bore. In particular, the recess has a converging cross-sectional profile, so that an annular gap formed between the recess and the axial channel section is narrowed in the direction of the inlet opening. Thus, a radial distance between the channel section and the shaft is smallest at the point of the inlet opening.

Due to the conical bore and the high speeds of the input shaft, the oil is safely thrown outwards, so that the entry of oil into the venting channel section is further reduced.

In a further embodiment, it is provided that the gearing housing has a mounting opening which is designed and/or suitable for mounting the input shaft. In particular, the input shaft can be inserted into the gearing housing or the accommodation space via the mounting opening. For this purpose, the mounting opening is introduced into the gearing housing coaxially to the main axis and permits access to the accommodation space. The gearing unit has a closure cover for closing the mounting opening or the accommodation space in which the venting device is integrated. The closure cover may be detachably connected to the gearing housing and/or arranged in the mounting opening. For example, the closure cover can be connected to the gearing housing in a form-fitting and/or force-fitting manner, at least in the radial direction. The closure cover may rest against the gear housing in a sealing manner in the circumferential direction in relation to the main axis via a sealing device, for example a sealing ring. The closure cover and the venting channel may be integrally formed, for example from a joint plastic injection molding, wherein the closure cover adjoins the venting channel, in particular the axial channel section, as a radially outwardly directed flange in relation to the main axis. In particular, the mounting opening is designed as a through-opening which passes through the housing in the axial direction in relation to the main axis, wherein the through-opening is closed on one axial side by the closure cover and on the other axial side forming a passage for the input shaft to connect to the drive unit.

By integrating the venting device in the closure cover, a particularly compact configuration of the venting device can be implemented. In addition, a simple and quick mounting of the input shaft and the venting device can be implemented through the mounting opening.

In a further embodiment, it is provided that the closure cover has a form-fitting contour and the mounting opening has a corresponding counter-contour. In principle, the form-fitting contour can be formed by an asymmetry of the closure cover. However, the form-fitting contour may be formed by a radially and/or axially aligned pin, nose, web or the like. The counter-contour, on the other hand, can be designed as a corresponding receptacle, opening, breakthrough, depression or the like, which is introduced into the gearing housing. The form-fitting contour and the counter-contour are in engagement with one another according to the poka-yoke principle, so that the closure cover can only be inserted into the mounting opening in a single orientation in a mounted state. In particular, the closure cover is oriented in the mounted state in such a way that the channel section runs upwards from the inlet opening to the outlet opening and/or the radial channel section is directed upwards.

One consideration of the disclosure is to propose a venting device which is particularly easy to install and at the same time ensures that the venting device is installed in the correct position.

In a further embodiment, it is provided that the gearing device is designed as a multi-stage, for example two-stage, spur gear. For this purpose, the input shaft is geared to an output shaft via an intermediate shaft. The input shaft may have a drive gear portion, the intermediate shaft may have first and second idler gear portions, and the output shaft may have an output gear portion. The drive gear section may mesh with one of the intermediate gear sections to form a first spur gear stage, and the output gear section may mesh with the other intermediate gear section to form a second spur gear stage. In principle, the drive wheel section and/or the output wheel section and/or the first and/or second intermediate wheel section can be designed as a gear wheel which is non-rotatably engaged with the respectively associated shaft. Alternatively, the drive wheel section and/or the output wheel section and/or the first and/or second intermediate wheel section can be designed as a tooth system which is integrated directly into the respectively associated shaft.

The disclosure further relates to a method for mounting the gearing unit as already described above, wherein the individual mounting steps are explained below.

In a first mounting step, a first housing component is provided. In particular, the first housing component is partially or fully opened in an axial direction with respect to the main axis. The first housing component can be arranged and/or fixed in a mounting direction.

In a further mounting step, the intermediate shaft and the output shaft are brought into meshing engagement with one another to form a gear wheel assembly or to form the second spur gear stage. In particular, the intermediate shaft and the output shaft are aligned outside of the first housing component in a mounting device and positioned in the correct position relative to one another. In particular, the mounting device sets the center distances and/or the angular positions of the intermediate shaft and the output shaft relative to one another and/or brings the one intermediate gear section and the output gear section into meshing engagement with one another.

In a further mounting step, the intermediate shaft and the output shaft—as the gear wheel assembly—are inserted together in the first housing component. In particular, the first housing component has a bearing point for each shaft, wherein the intermediate shaft and the output shaft are each rotatably mounted via a bearing device in the corresponding bearing point.

In a further mounting step, a second housing component is connected to the first housing component, so that the gearing housing is closed and the accommodation space is defined. In particular, the second housing component is partially or fully open in an opposite axial direction with respect to the main axis. In an intermediate step, a sealing means for sealing the accommodation space between the two housing components may be arranged. The two housing components can then be connected to one another in a form-fitting and/or force-fitting and/or bonded manner. In particular, the second housing component has a further bearing point for each shaft, wherein the intermediate shaft and the output shaft are each rotatably mounted via a further bearing device in the corresponding bearing point.

In a further mounting step, the input shaft is inserted into the accommodation space via the mounting opening, wherein the input shaft is brought into meshing engagement with the intermediate shaft. In particular, in an intermediate step, the bearing devices associated with the input shaft are pressed onto the input shaft. The input shaft, with the pressed-on bearing devices, is then inserted into the gearing housing through the mounting opening. At the same time, the mounting opening can form a bearing point for the bearing devices of the input shaft.

In a further mounting step, the mounting opening is closed by the closure cover, so that the venting device is arranged coaxially to the main axis and on the axial end side of the input shaft. In particular, the closure cover is inserted into the mounting opening in a force-fitting and/or form-fitting manner and positioned in the correct position in the mounting opening via the form-fitting contour.

A method is thus proposed in which only two of the three shafts have to be aligned before being inserted into the gearing housing, so that the mounting effort can be significantly reduced.

BRIEF DESCRIPTION OF THE DRAWINGS

Further features, advantages, and effects of the disclosure are set out in the following description of the preferred exemplary embodiments of the disclosure. In the figures.

DETAILED DESCRIPTION

Figure 1:
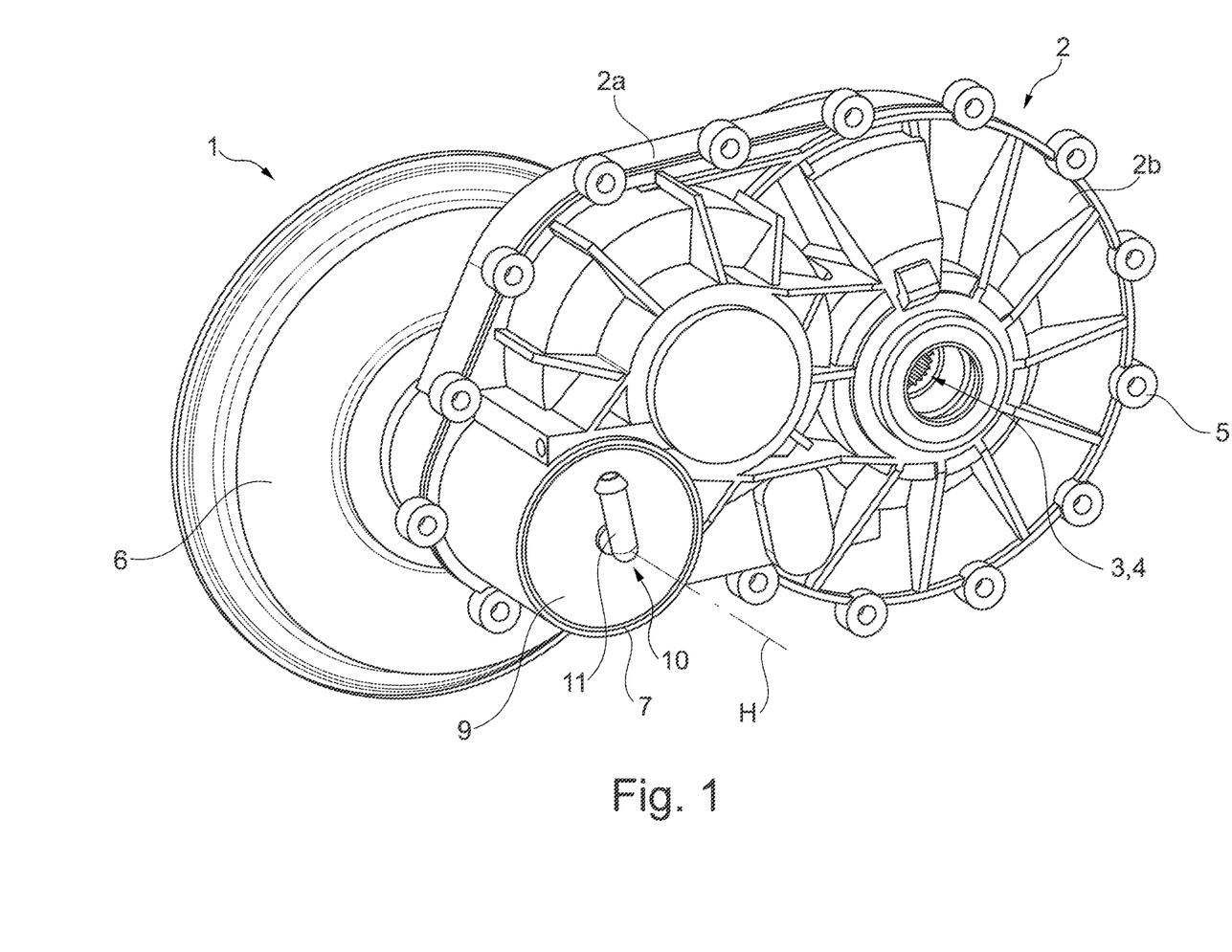
FIG. 1 shows a perspective representation of a gearing unit as an exemplary embodiment of the disclosure.

FIG. 1 shows a perspective representation of a gearing unit 1 as an exemplary embodiment of the disclosure, which is designed and/or suitable for a drive assembly of a vehicle. For example, the vehicle is designed as a purely electric vehicle or as a hybrid vehicle. The gearing unit 1 transmits a drive torque to one or more vehicle wheels, wherein the drive torque is generated and/or provided, for example, by a drive unit, for example an electric motor. The gearing unit 1 is and/or can be geared to the drive unit, not shown.

The gearing unit 1 has a gearing housing 2 which, composed of a first and a second housing component 2*a, b*, defines an accommodation space 3 for a gearing device 4. The gearing device 4 is designed as a transmission gear, which is suitable for translating the drive torque. In particular, the gearing device 4 has a transmission ratio of I>1, such that the drive torque transmitted to the gearing device 4 at a gearbox output is increased or a speed at the gearbox output is reduced.

For example, the two housing components 2*a, b* are made of cast aluminum and are detachably connected to one another in an axial direction AR in relation to a main axis H. For this purpose, the two housing components 2*a, b* are supported on one another in the axial direction AR and are screwed together via multiple screw means 5. The first housing component 2*a* also has an end shield 6, which at the same time forms a motor shield for the drive unit, in particular the electric motor.

Figure 2:
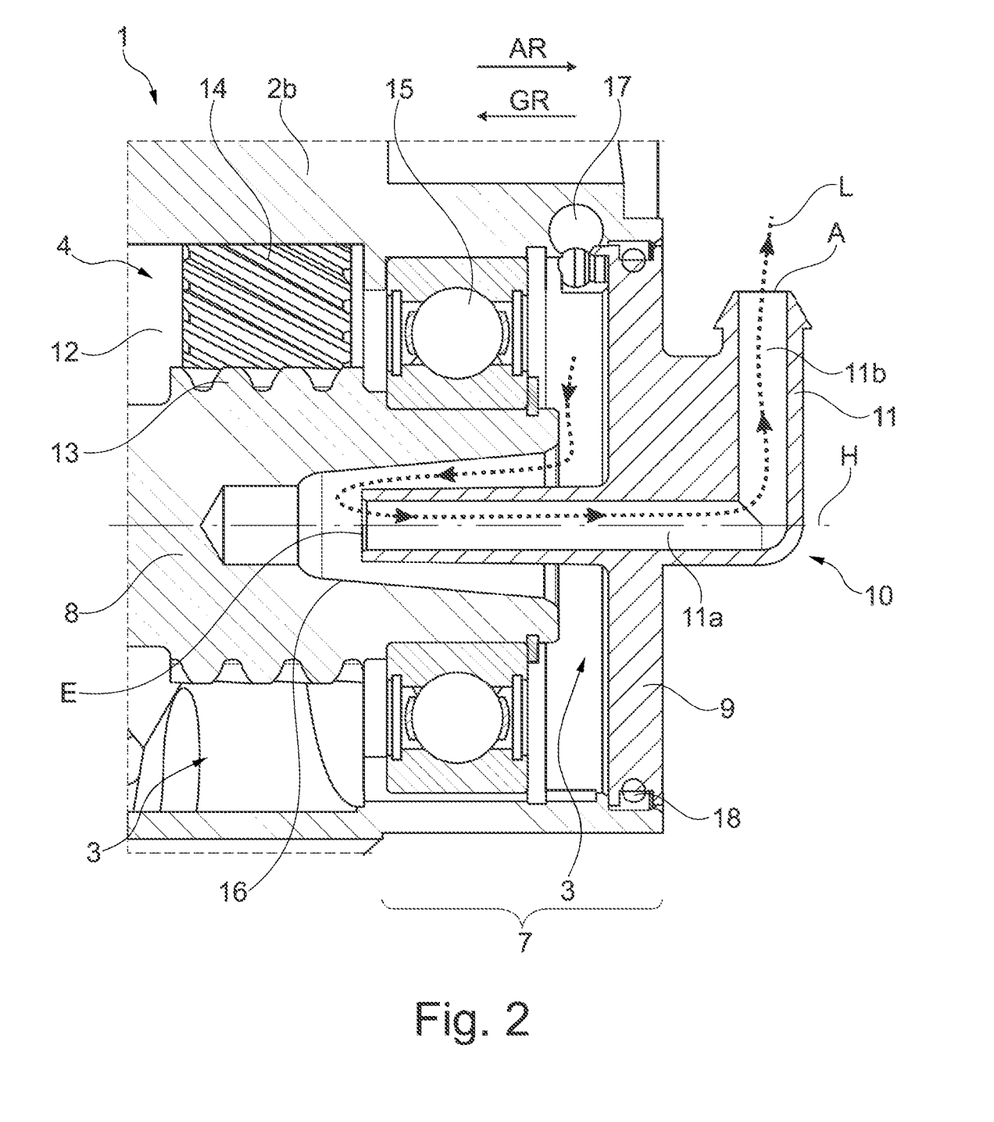
FIG. 2 shows a detailed sectional representation of the gearing unit from FIG. 1.

The second housing component 2*b* has a cylindrical mounting opening 7, wherein an input shaft 8 of the gearing device 4 is mounted via the mounting opening 7, as shown in FIG. 2. The mounting opening 7 is made in the second housing component 2*b* coaxially to the main axis H and is closed in the axial direction AR with respect to the main axis H by a closure cover 9.

The gearing unit 1 has a venting device 10, which vents the accommodation space 3. The venting device 10 is formed by a venting channel 11, which is integrated coaxially to the main axis H in the closure cover 9. The venting channel 11 fluidically connects the accommodation space 3 with an environment, so that air and/or vapor located in the accommodation space 3 can escape via the venting channel 11 into the environment or possibly a connected venting system.

The specific configuration and the function of the venting device 10 are explained in the following FIG. 2, which shows a detailed view of the gearing unit 1 in a longitudinal section along the main axis H.

The gearing device 4 is designed as a two-stage spur gear, wherein the input shaft 8 is in meshing engagement with an intermediate shaft 12 to form a first spur gear stage. For this purpose, the input shaft 8 has a drive wheel section 13 and the intermediate shaft 12 has a first intermediate wheel section 14, which engage with one another. The drive wheel section 13 is designed as an external tooth system formed on the input shaft 8. The first intermediate wheel section 14 is designed, for example, as a gear wheel which is non-rotatably connected to the intermediate shaft 12.

As can be seen from FIG. 2, the input shaft 8 is arranged coaxially to the main axis H in the gearing housing 2 and is rotatably supported on the second housing component 2b via a bearing device 15, for example a grooved ball bearing, within the mounting opening 7. In particular, the main axis H is defined by an axis of rotation of the input shaft 8. The input shaft 8 transmits the drive torque from the drive unit to the gearing device 4, wherein the input shaft 8 is geared to the drive unit for this purpose. For example, the input shaft 8 can be designed as an engine shaft of the electric motor.

The position of the venting device 10 in the gearing unit 1 is aligned centrally to the input shaft 8 and thus also centrally to the electric drive unit. The venting device 10 is arranged immediately adjacent to the main axis H on an axial end side of the input shaft 8. During operation, the highest speed always occurs on the input shaft 8, and due to the high speed, the oil is conveyed outwards and thus away from the venting device 10 by the centrifugal force. This prevents, or at least reduces, the penetration of oil, oil mist, or oil foam into the venting channel 11.

The input shaft 8 has a recess 16 on the axial end side, which is made in an end face of the input shaft 8. The recess 16 is designed as a conical bore, which extends into the input shaft 8 coaxially in relation to the main axis H.

The venting channel 11 has an axial channel section 11a and a radial channel section 11b, wherein the axial channel section 11a runs coaxially to the main axis H in the accommodation space 3 and is accommodated in the recess 16 at the end with a radial and an axial spacing. The radial channel section 11b adjoins the axial channel section 11b in a radial direction, for example at an angle of 90 degrees, outside the gearing housing 2, in particular after the closure cover 9.

The axial channel section 11a has an inlet opening E at its free end and the radial channel section 11b has an outlet opening A at its free end. An air flow path L thus runs from the accommodation space 3 via an annular gap formed between the recess 16 and the axial channel section 11a to the inlet opening E and via the venting channel 11 to the outlet opening A. The venting channel 11 has an ascending portion between the inlet opening E and the outlet opening A. For this purpose, the radial channel section 11b is directed upwards in an installation situation or is oriented in a 12 o'clock position in relation to an imaginary clock face arranged coaxial to the main axis H. The ascending portion in the venting channel 11 ensures that any oil in the axial channel section 11a is held back by the outlet opening A and can flow back into the accommodation space 3 if necessary.

At the location of the outlet opening A, the radial channel section 11b also has a hose connection for connecting a venting hose.

In order to be able to ensure lubrication of the bearing device 15, a fluid channel 17 is integrated into the gearing housing 2, in particular the second housing component 2b, which channels the oil located in the accommodation space 3 to the axial end side of the input shaft 8.

In order to seal the accommodation space 3 or the mounting opening 7 in the axial direction AR against oil escaping, the closure cover 9 is sealed in the radial direction via a sealing device 18 with respect to the second housing component 2b. The sealing device 18 is designed, for example, as a sealing ring which is mounted on the closure cover 9 on the peripheral side.

Figure 3A:
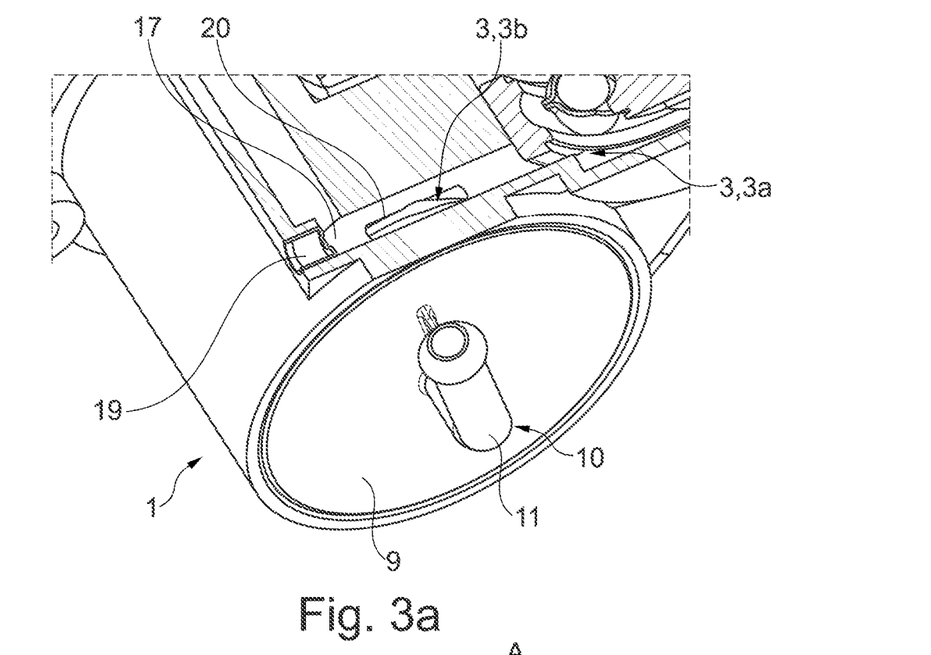
FIG. 3*a* shows a further detailed sectional representation of the gearing unit from FIG. 1.

FIG. 3a shows a detailed view of the gearing unit 1 in a further sectional view through the fluid channel 17. The fluid channel 17 is designed as a through-hole, which is introduced into the second housing component 2b and is closed to the outside by a sealing plug 19. In addition, the through-hole has an opening 20 in the direction of the accommodation space 3 in order to fluidically connect a first housing area 3a to a second housing area 3b. In this case, for example, an oil inlet is arranged in the first housing area 3a, which is used to fill the accommodation space 3 with the oil. The bearing device 15 is arranged in the second housing region 3b, wherein lubrication of the bearing device 15 is ensured by the fluid channel 17.

Figure 3B:
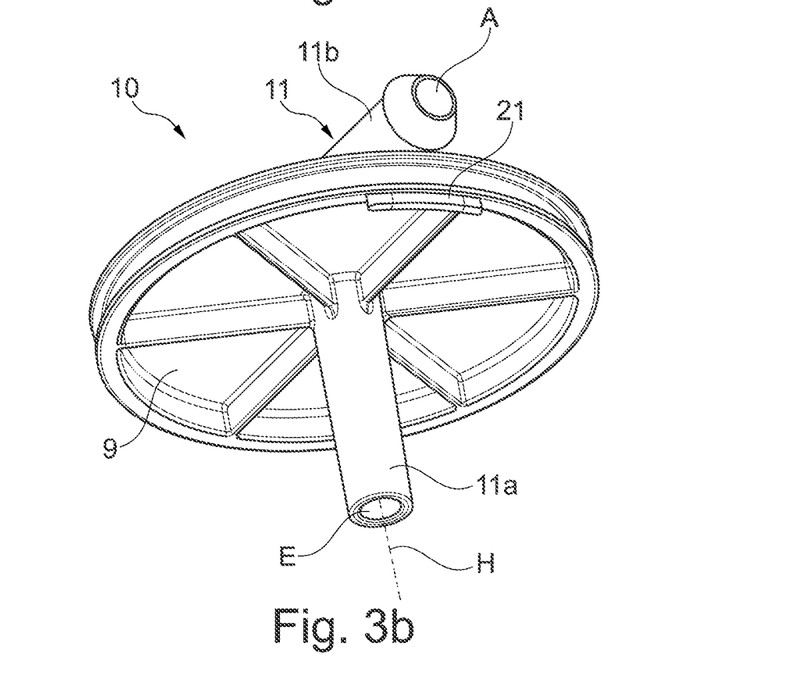
FIG. 3*b* shows a perspective representation of a closure cover with an integrated venting device for the gearing unit from FIG. 1.

FIG. 3b shows a perspective view of the closure cover 9 with the integrated venting channel 11 to form the venting device 10. The closure cover 9 and the venting channel 11 are made from a common material section, for example a common plastic injection molding. The axial channel section 11a is arranged in the center of the closure cover 9, wherein the closure cover 9 adjoins the axial channel section 11a as a radially outwardly directed flange in relation to the main axis H.

Furthermore, the closure cover 9 has a form-fitting contour 21 which can be brought into engagement with a counter-contour, not shown, arranged on the second housing component 2b. The form-fitting contour 21 is designed as a web directed in the axial direction, wherein it is possible for the counter-contour to be designed as a corresponding groove which is introduced into the second housing component 2b. The form-fitting contour 21 and the counter-contour can be in engagement with one another in a mounted state according to the poka-yoke principle, so that the closure cover 9 can only be inserted into the mounting opening 7 in a single orientation. In particular, in the mounted state, the radial channel section 11b is directed upwards, wherein the form-fitting contour 21 can ensure that the venting device 11 is installed in the correct position.

Figures 4A, 4B, 4C, 4D, 4E:
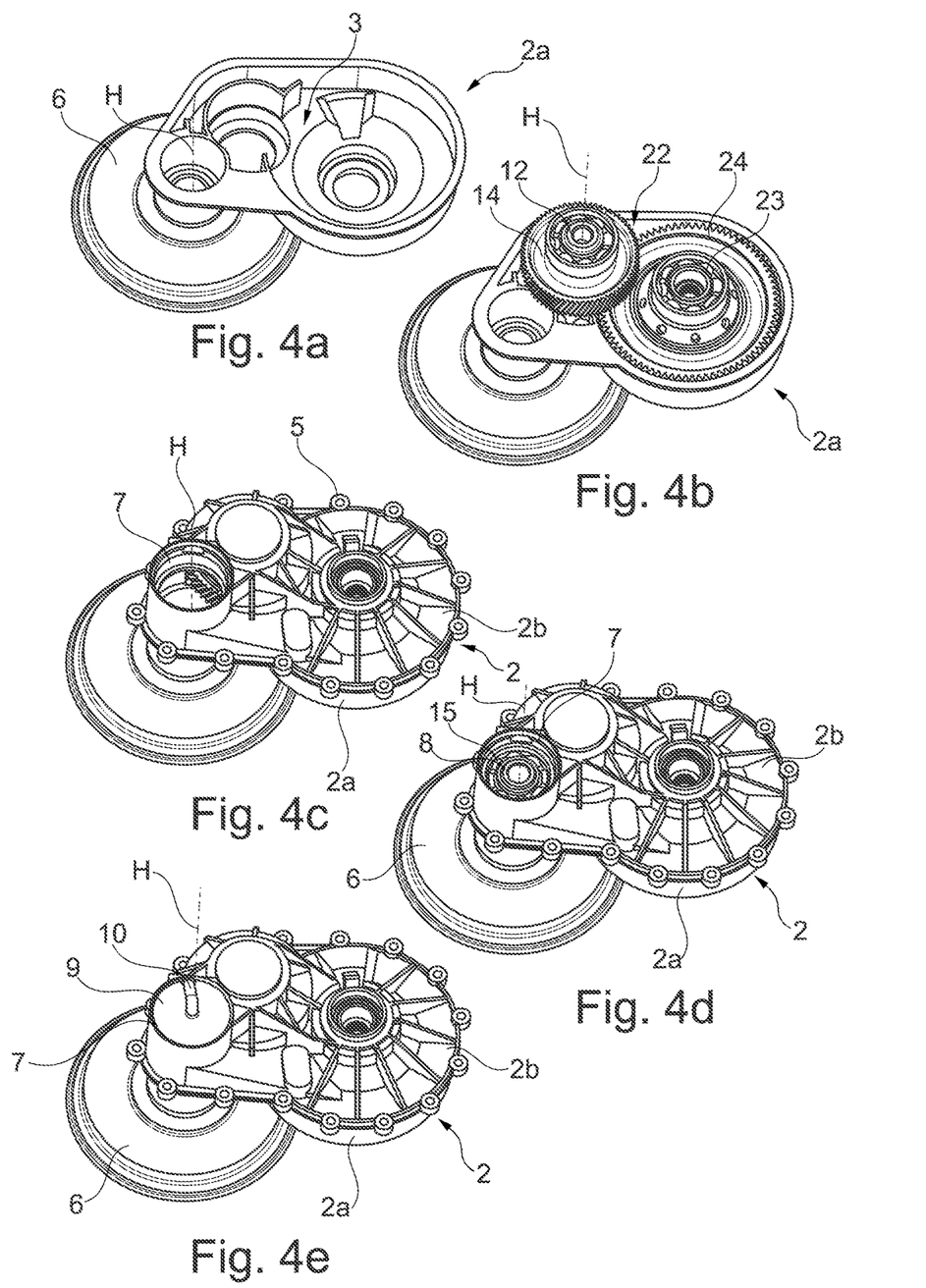
FIGS. 4*a-e* show different mounting steps of a method for mounting the gearing unit from FIG. 1.

FIGS. 4a to 4e show different mounting steps for mounting the gearing unit 1. A first mounting step is shown in FIG. 4a, wherein the first housing component 2a is provided in the first mounting step. The first housing component 2a forms a first housing half, which is open in the axial direction AR in relation to the main axis H and forms part of the accommodation space 3.

FIG. 4b shows a second mounting step, in which a pre-adjusted gear wheel assembly 22 is inserted into the accommodation space 3 of the first housing component 2a. The gear wheel assembly 22 comprises the intermediate shaft 12 with the intermediate wheel section 14 as a first intermediate wheel non-rotatably connected to the intermediate shaft 12, and a further intermediate wheel section (covered by the intermediate wheel section 14) as a second intermediate wheel non-rotatably connected to the intermediate shaft 12. Furthermore, the gear wheel assembly 22 comprises an output shaft 23 for forming the gear output and an output wheel section 24, wherein the output wheel section 24 is designed as a gear wheel which is non-rotatably connected to the output shaft 23. In an intermediate step, the intermediate shaft 12 and the output shaft 23 are aligned prior to being joined in the first housing component 2*a* and the output gear section 24 is brought into meshing engagement with the further intermediate gear section to form a second spur gear stage. The gear wheel assembly 22 is then inserted into the first housing component 2*a*, wherein the intermediate shaft 12 and the output shaft 23 are mounted in the first housing component 2*a*.

FIG. 4*c* shows a third mounting step, in which the second housing component 2*b* is connected to the first housing component 2*a*. The second housing component 2*b* forms a second housing half, which is open in the opposite axial direction GR with respect to the main axis H and forms part of the accommodation space 3. In an intermediate step, a sealant can be arranged at the connection point, for example the housing flange, of the first and/or second housing component 2*a, b* in order to seal the two housing components 2*a, b* together. For example, the sealing means can be in the form of a flat gasket or a sealing composite. The second housing component 2*b* is then placed on the first housing component 2*a* in the opposite axial direction GR and screwed to the first housing component 2*a* via the screw means 4.

FIG. 4*d* shows a fourth mounting step, in which the input shaft 8 is inserted into the gearing housing 2 via the mounting opening 7, wherein the input shaft 8 is brought into meshing engagement with the intermediate gear section 14 via the drive wheel section 13, as shown in FIG. 2*a*, to form the first spur gear stage. In an intermediate step, the bearing device 15 and a further bearing device (covered by the gearing housing 2) are pressed onto the input shaft 8 on both sides. The input shaft 8 with the bearing devices 15 pressed thereon is then inserted into the gearing housing 2 in the axial direction AR with respect to the main axis H via the mounting opening 7, wherein the input shaft 8 is guided out of the gearing housing 2 again on the side of the bearing plate 6 and forms the gearbox input.

FIG. 4*e* shows a fifth mounting step, in which the mounting opening 7 is closed by the closure cover 9 and the integrated venting device 10 is arranged coaxially to the main axis H on the axial end side of the input shaft 8. For this purpose, the closure cover 9 can be pressed into the mounting opening 7, wherein the venting device 10 is positioned in the correct position in the mounting opening 7 via the form-fitting contour 21.

Thus, a method is proposed which simplifies mounting of the gearing device 4, in which only the intermediate shaft 12 and the output shaft 23 have to be aligned before joining in the gearing housing 2. A complex alignment of the shafts 8, 12, 23 before they are joined into the gearing housing 2 can thus be dispensed with.

LIST OF REFERENCE SYMBOLS

1 Gearing unit
2 Gearing housing
2*a, b* Gearing housing components
3 Accommodation space
3*a, b* Housing areas
4 Gearing device
5 Screw means
6 End shield
7 Mounting opening
8 Input shaft
9 Closing cover
10 Venting device
11 Venting channel
11*a, b* Channel sections
12 Intermediate shaft
13 Drive wheel section
14 Intermediate wheel section
15 Bearing device
16 Recess
17 Fluid channel
18 Sealing device
19 Closure stop
20 Opening
21 Form-fitting contour
22 Gear wheel assembly
23 Output shaft
A Output opening
E Input opening
H Main axis
L Air flow path
AR Axial direction
GR Axial opposite direction

What is claimed is:

1. A gearing unit for a drive assembly, comprising:
a gearing housing defining an accommodation space;
a gearing device housed in the gearing housing and configured to convert a drive torque of the drive assembly, the gearing device including a mounting opening and an input shaft mounted through the mounting opening and defining a main axis;
a closure cover received in and closing the mounting opening, the closure cover being sealed to the gearing device via a sealing device arranged radially between the closure cover and the gearing device in the mounting opening;
a venting device integrated with the closure cover and extending through the closure cover to the accommodation space;
wherein the venting device is arranged coaxially to the main axis and on an axial end side of the input shaft.

2. The gearing unit according to claim 1, wherein the closure cover is pressed into the mounting opening.

3. The gearing unit according to claim 1, wherein the venting device includes a venting channel, wherein the venting channel includes an axial channel section extending coaxially to the main axis in the accommodation space and through the closure cover.

4. The gearing unit according to claim 3, wherein the venting channel includes an inlet opening and an outlet opening, wherein the venting channel includes an ascending portion between the inlet opening and the outlet opening.

5. The gearing unit according to claim 3, wherein the venting channel includes a radial channel section extending radially from the main axis and adjoining the axial channel section outside of the accommodation space.

6. The gearing unit according to claim 3, wherein the input shaft includes a recess on the axial end side, wherein the recess extends coaxially with the main axis, and wherein the axial channel section includes an axial end arranged within the recess and spaced apart from the input shaft.

7. The gearing unit according to claim 1, wherein the closure cover is configured to engage with the mounting opening only when the closure cover is inserted into the mounting opening in a specified orientation.

8. The gearing unit according to claim 1, wherein the gearing device further includes an intermediate shaft in meshing engagement with the input shaft, and an output shaft in meshing engagement with the intermediate shaft.

9. The gearing unit according to claim 1, wherein the sealing device is arranged in a groove on a peripheral side of the closure cover.

* * * * *